US009770831B2

(12) United States Patent
Sakai et al.

(10) Patent No.: US 9,770,831 B2
(45) Date of Patent: Sep. 26, 2017

(54) INDUSTRIAL ROBOT

(71) Applicant: NACHI-FUJIKOSHI CORP., Toyama (JP)

(72) Inventors: Takashi Sakai, Toyama (JP); Shunsuke Kosaka, Toyama (JP); Akira Kunisaki, Toyama (JP)

(73) Assignee: NACHI-FUJIKOSHI CORP., Toyama-shi, Toyama (JP)

( * ) Notice: Subject to any disclaimer, the term of this patent is extended or adjusted under 35 U.S.C. 154(b) by 303 days.

(21) Appl. No.: 14/633,288

(22) Filed: Feb. 27, 2015

(65) Prior Publication Data
US 2015/0246449 A1 Sep. 3, 2015

(30) Foreign Application Priority Data

Feb. 28, 2014 (JP) .................................. 2014-039038

(51) Int. Cl.
*B25J 19/00* (2006.01)
(52) U.S. Cl.
CPC ...... *B25J 19/0025* (2013.01); *Y10T 74/20311* (2015.01)
(58) Field of Classification Search
CPC .................................................. B25J 19/0025
See application file for complete search history.

(56) References Cited

U.S. PATENT DOCUMENTS

| 4,668,146 A * | 5/1987 | Ageta | B25J 19/0079 310/112 |
| 6,431,018 B1 * | 8/2002 | Okada | B25J 19/0025 248/229.22 |
| 6,696,810 B2 * | 2/2004 | Uematsu | B25J 17/0283 318/568.11 |
| 6,956,347 B2 * | 10/2005 | Nihei | B25J 19/023 318/568.16 |
| 7,320,264 B2 * | 1/2008 | Albertsson | B25J 19/0025 414/680 |
| 8,627,741 B2 * | 1/2014 | Barkman | B25J 9/0009 74/490.01 |
| 8,631,720 B2 * | 1/2014 | Nakagiri | B25J 19/0029 74/490.02 |
| 2005/0011295 A1 * | 1/2005 | Shiraki | B25J 19/0025 74/490.02 |
| 2006/0230862 A1 * | 10/2006 | Miyazaki | B25J 19/0029 74/490.01 |
| 2008/0229861 A1 * | 9/2008 | Inoue | B25J 19/0029 74/490.01 |

(Continued)

FOREIGN PATENT DOCUMENTS

JP 2013-049135 3/2013

*Primary Examiner* — David M Fenstermacher
(74) *Attorney, Agent, or Firm* — Harness, Dickey & Pierce, P.L.C.

(57) ABSTRACT

A cable drawn from a lower arm of a robot into a first upper arm part of an upper arm is further drawn out to an exterior space of the robot through a first hole of a second upper arm part. The cable is drawn in contact with a sidewall part of the second upper arm part, and is disposed in a wrist arrangement portion through a second hole. A slack part is formed taking account of a length of the cable pulled by a wrist when the wrist pivots in the wrist arrangement portion, and the cable is drawn to a tool through a through hole of the wrist.

9 Claims, 6 Drawing Sheets

(56) References Cited

U.S. PATENT DOCUMENTS

| | | | | |
|---|---|---|---|---|
| 2012/0067157 A1* | 3/2012 | Suzuki | ................. | B25J 19/0025 |
| | | | | 74/490.02 |
| 2012/0111135 A1* | 5/2012 | Ichibangase | ......... | B25J 17/0283 |
| | | | | 74/490.06 |
| 2014/0020498 A1* | 1/2014 | Adachi | ................. | B25J 19/0029 |
| | | | | 74/490.02 |
| 2014/0290415 A1* | 10/2014 | Hasuo | ................. | B25J 19/0025 |
| | | | | 74/490.02 |
| 2015/0007681 A1* | 1/2015 | Murakami | ........... | B25J 19/0025 |
| | | | | 74/490.02 |
| 2015/0027261 A1* | 1/2015 | Okahisa | ................... | B25J 18/04 |
| | | | | 74/490.02 |
| 2016/0114491 A1* | 4/2016 | Lee | ...................... | B25J 19/0029 |
| | | | | 74/490.06 |
| 2016/0176044 A1* | 6/2016 | Cole | ........................ | B25J 9/104 |
| | | | | 700/258 |

\* cited by examiner

INDUSTRIAL ROBOT

CROSS-REFERENCE TO RELATED APLLICATION

This application claims the benefit of priority from Japanese Patent Application No. 2014-039038 filed on Feb. 28, 2014, the entire disclosure of which is incorporated herein by reference.

BACKGROUND OF THE INVENTION (1) Field of the Invention

The present invention relates to an industrial robot including an arm pivotally attached to a frame, and a wrist pivotally attached to the arm.

(2) Description of Related Art

A typical industrial robot (hereafter, simply referred to as a "robot") includes a frame (robot body), an arm pivotally attached to the frame, and a wrist pivotally attached to the arm, to which wrist a working tool (end effector) is attached. A power supply line for supplying power to driving means (a servo motor, for example) for pivoting the arm and the wrist, an air tube for supplying air to an air cylinder provided in the tool, and the like are put together into one bundle (hereafter, the one in this state is referred to as a "cable"), which extends while being accommodated inside the robot or secured to the outside.

The arm and the wrist of the robot are provided so as to be pivotable in a predetermined angle range. If the cable is excessively pulled when the arm and/or the wrist are pivoted, there is a risk of causing damage such as line breakage. For that reason, the cable is installed to extend with a (marginal length) so as not to be damaged even when the arm and/or the wrist maximally pivots. However, if the slack is too long, it may cause resistance against pivoting of the arm and/or the wrist, or may interfere with peripheral members. Moreover, a phenomenon that the cable "moves uncontrollably" may occur when the arm and/or wrist move at a high speed. Further, the outside appearance of the robot becomes degraded.

In order to remove the deficiencies, a large number of patent applications have been filed (see JP-A-2013-49135, for example).

BRIEF SUMMARY OF THE INVENTION

In view of the above described deficiencies, it is an object of the present invention to provide a robot which does not increase a slack of a cable and degrade the outside appearance, but facilitates the work of installing a cable and prevents uncontrollable movement of the cable during operation of the robot.

In order to achieve the above described object, the present invention provides:

an industrial robot including: a frame; an arm pivotally attached to the frame; and a wrist pivotally attached to the arm, wherein the arm includes a cable accommodating portion for accommodating a cable therein that extends from the frame, a wrist arrangement portion for disposing the wrist therein, a first hole communicating the cable accommodating portion with an exterior space of the arm, and a second hole communicating the wrist arrangement portion with the exterior space of the arm, and the cable extending from the frame to the cable accommodating portion further extends to the wrist by being once drawn out to the exterior space of the arm through the first hole and then drawn into the wrist arrangement portion through the second hole from the exterior space of the arm.

The cable extending from the frame is accommodated in the cable accommodating portion of the arm. This cable is drawn out from the cable accommodating portion to the exterior space of the arm through the first hole, is arranged outside the arm, and is drawn from the exterior space into the second hole to extend to the wrist arrangement portion of the arm. In this state, it is possible to dispose the cable in the exterior space of the arm (that is, a portion of the cable after exiting the first hole until entering the second hole) with no (or little) slack, and to dispose the cable in the wrist arrangement portion of the arm (that is, a portion of the cable after exiting the second hole until reaching the wrist) with a slack. By this configuration, a length of the cable pulled by the wrist when the wrist pivots is absorbed by the slack, and thus the cable is not excessively pulled. Moreover, since there is no (or little) slack in the cable disposed in the exterior space of the arm, the cable is prevented from increasing the length thereof and moving uncontrollably when the arm and the wrist pivot at a high speed. Further, since the cable extends through the exterior space, only a small space where the cable is disposed in the wrist arrangement portion of the arm is needed, whereby the space for the wrist arrangement portion is saved, which in turn leads to size reduction of the robot.

At least one of the first hole and the second hole may be provided at each of a plurality of locations in the arm.

If the number of power supply lines, air tubes and the like which constitute a cable increases, or the outer diameters thereof increase, the outer diameter of the cable increases accordingly, which makes installing operation of the cable difficult. However, in the case of the present invention, since at least one of the first and second holes is provided at each of a plurality of locations, it is possible to install the cable while decreasing the outer diameter thereof by branching off the cable in the middle. The branching off of the cable may be performed at a position before or after the cable exits the first hole.

In the above described cable, a portion which is disposed between an exit part of the first hole and an entrance part of the second hole is preferably secured to the arm.

By the configuration, since the cable moves integrally with the arm, it is possible to reliably prevent the cable from moving uncontrollably even if the arm pivots at a high speed.

A working tool is attached to the above described wrist, and a through hole is provided in the wrist to pass therethrough, and the cable drawn into the wrist arrangement portion can extend to the tool through the through hole.

The above described arm includes a first arm part pivotally attached to the frame, and a second arm part extending from and pivotally attached to the first arm part, in which second arm part the wrist arrangement portion is provided, and the first hole and the second hole are provided in the second arm part.

The above described cable is installed to extend between the second hole and the wrist with a certain slack, and the length of the slack is larger than a length of the cable that is pulled by the wrist when the wrist is maximally pivots with respect to the arm.

When the wrist maximally pivots, the length of the cable pulled by the wrist is compensated by the preset slack of the cable. Therefore, the wrist does not excessively pull the cable, and the cable is hardly damaged.

Preferably, the above described arm includes a pair of wrist support parts, and the wrist is interposed between the pair of the wrist support parts so as to be pivotally supported.

By the configuration, the rigidity of the wrist increases. However, the wrist may be supported by a single wrist support part in a cantilever manner.

DETAILED DESCRIPTION OF THE INVENTION

Hereafter, embodiments of the present invention will be described in detail.
(Embodiment 1)

Figure 1:
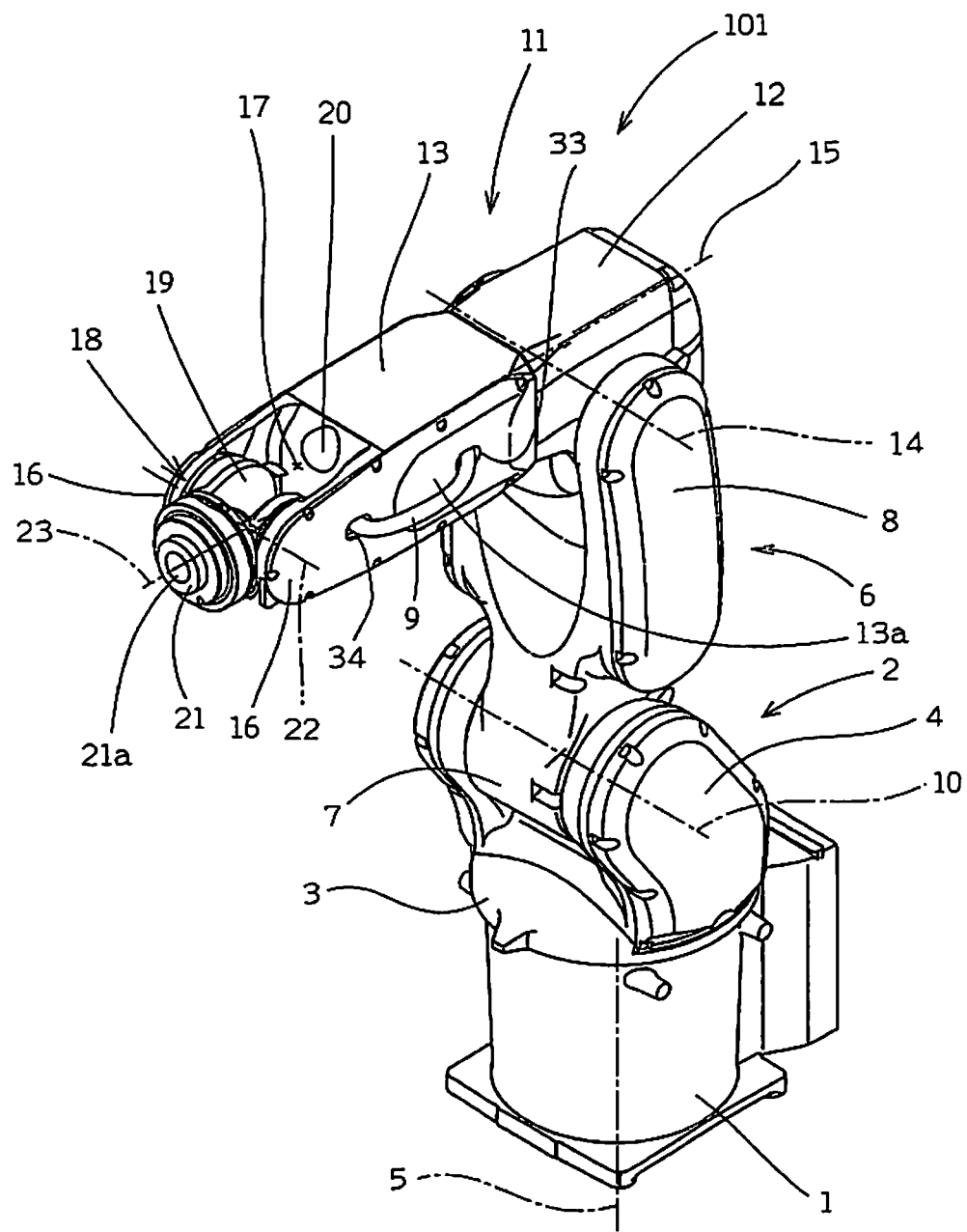
FIG. 1 is a perspective view of a robot 101 according to a first embodiment of the present invention.

First, a general configuration of a robot 101 according to a first embodiment will be described. As shown in FIG. 1, a frame 2 is placed on a base 1 which is installed on an installation surface such as a floor surface. This frame 2 includes a base plate part 3 disposed on an upper surface of the base 1, and a pair of stand plate parts 4 which stand obliquely upward from peripheral edges of the base plate part 3, respectively. Moreover, a motor (not shown) for pivotally moving the entire frame 2 in a horizontal plane (in a plane parallel with the floor surface) is attached to the upper surface of the base plate part 3. By rotating the motor shaft of the motor in a predetermined direction, the frame 2 pivots about a first pivot axis 5 provided perpendicular to the installation surface.

A lower half part of a lower arm 6 is attached between the pair of stand plate parts 4 of the frame 2. The lower half part of the lower arm 6 has a substantially cylindrical shape and constitutes a cylindrical part 7, and an upper half part of the lower arm 6 is bifurcated in the axial direction of the cylindrical part 7, forming a pair of fork parts 8. The inside of at least one of the pair of fork parts 8 is configured to form a cavity such that a cable 9 (see FIG. 3) can be drawn thereinto. The lower arm 6 is supported by interposing the cylindrical part 7 thereof between the pair of stand plate parts 4 of the frame 2, and is pivotable about a second pivot axis 10 provided on the axis of the cylindrical part 7.

An upper arm 11 is attached between the pair of fork parts 8 of the lower arm 6. The upper arm 11 includes a first upper arm part 12 which is interposed between the pair of fork parts 8 of the lower arm 6, and a second upper arm part 13 which is extended from one end part of the first upper arm part 12. The first upper arm part 12 pivots about a third pivot axis 14 connected to the lower arm 6. The second upper arm part 13 is pivotable about a fourth pivot axis 15 with respect to the first upper arm part 12.

Figure 2:
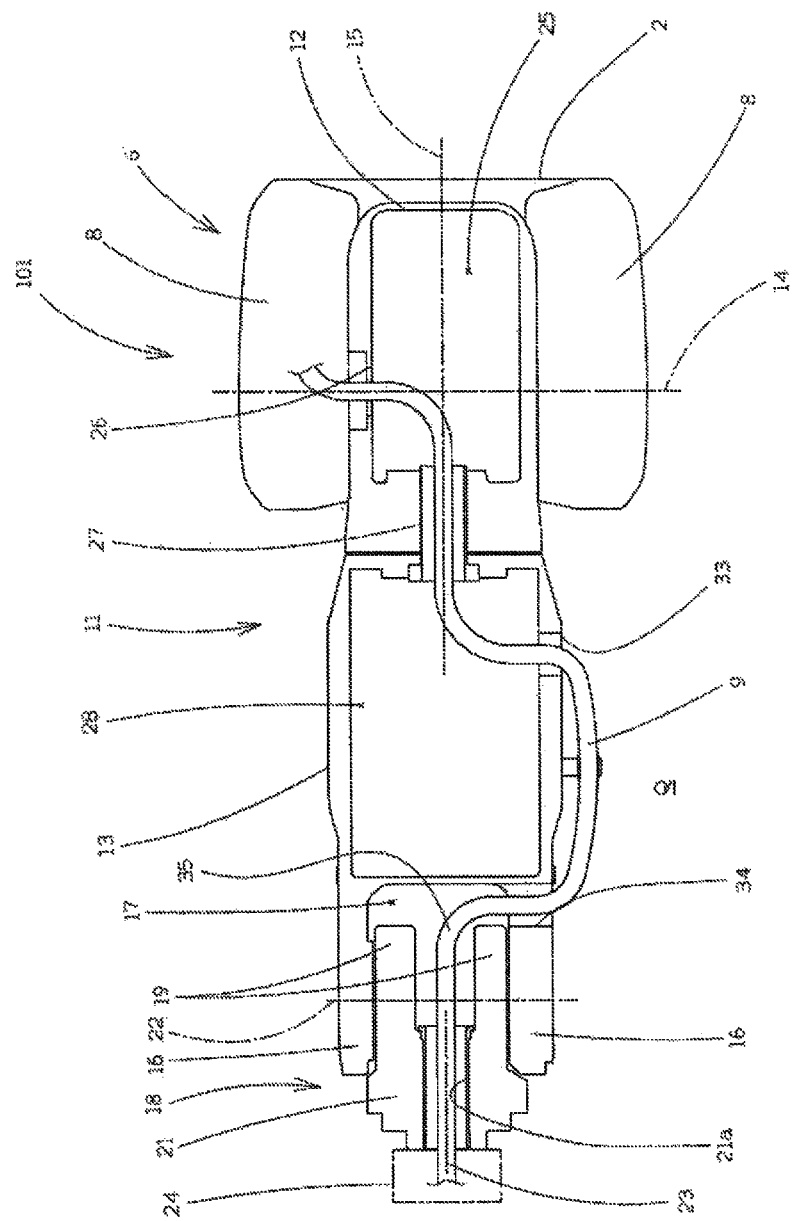
FIG. 2 is a plan sectional view of an upper arm 11 of the robot shown in FIG. 1.

A pair of wrist support parts 16 are provided at a distal end part (an end part opposite to an end part which is connected with the first upper arm part 12) of the second upper arm part 13 so as to be extended therefrom, and a wrist 18 is attached in a wrist arrangement portion 17 which is formed between the wrist support parts 16. The wrist 18 includes a pair of first wrist parts 19 having a disc shape and disposed opposite to the pair of wrist support parts 16 of the second upper arm part 13, and a second wrist part 21 having a disc shape and secured substantially perpendicular to the pair of first wrist parts 19. A through hole 21a is provided at a center line of the second wrist part 21. The first wrist parts 19 are supported by the pair of wrist support parts 16 of the second upper arm part 13, and are pivotable about a fifth pivot axis 22. Moreover, the second wrist part 21 of the wrist 18 is pivotable about a sixth pivot axis 23 with respect to the first wrist part 19. A relief part 20 for avoiding any interference when the wrist 18 pivots is provided in the wrist arrangement portion 17 in the second upper arm part 13. As described above, the robot 101 according to the first embodiment is a 6-axes articulated robot with the first to sixth pivot axes 5, 10, 14, 15, 22, and 23. Further, as shown in FIG. 2, the cable 9 for moving (pivoting) of each part of the robot 101 is drawn into the base 1 from the outside of the robot 101 to extend to a tool 24 (end effector) through the frame 2, the lower arm 6, the upper arm 11, and the wrist 18.

Next, characteristic features relating to the present invention in the robot 101 according to the first embodiment will be described in detail. It is noted that only the configuration for installing the cable 9 in the robot 101 will be described in detail herein. Therefore, description and illustration will be omitted on the configuration of members (a motor, a speed reducer, bearings, gears, etc.) for operating (pivoting) of the arms 6 and 11 and the wrist 18. As shown in FIG. 2, a space (a first cable accommodating portion 25) for accommodating the cable 9 is provided in a peripheral part of the third pivot axis 14 in the first upper arm part 12 of the upper arm 11. The first cable accommodating portion 25 is in communication with at least one of the fork parts 8, which constitute the lower arm 6, through a communication hole 26. The cable 9 is drawn into the first cable accommodating portion 25 from the fork part 8 of the lower arm 6 through the communication hole 26.

At a connection part between the first upper arm part 12 and the second upper arm part 13 of the upper arm 11, a pipe member 27 is attached on the fourth pivot axis 15 to span the both arm parts,. A second cable accommodating portion 28 is provided also in the second upper arm part 13 in the same manner as the first upper arm part 12. The cable 9 drawn into the first cable accommodating portion 25 of the first upper arm part 12 is drawn into the second cable accommodating portion 28 of the second upper arm part 13 through the pipe member 27. Since the center line of the pipe member 27 coincides with the fourth pivot axis 15, the cable 9 is just twisted when the second upper arm part 13 pivots about the fourth pivot axis 15, and therefore the durability of the cable 9 becomes high.

Figure 3:
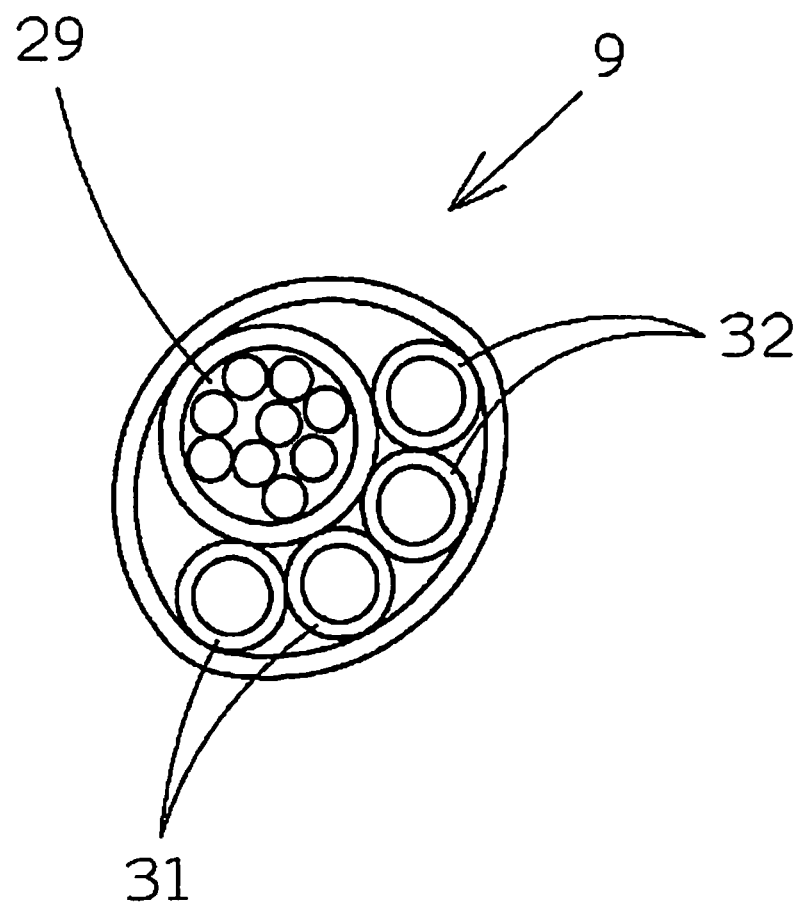
FIG. 3 is a sectional view of a cable 9 of the robot shown in FIG. 1.

Next, the cable 9 to be used with the robot 101 according to the first embodiment will be described. As shown in FIG. 3, the cable 9 is formed by bundling a power supply line 29, in which a large number of element wires are bundled and whose outer periphery is coated with an insulator, and a plurality of air tubes 31, 32 made of resin material. It is noted that the outer diameters and the number of the power supply lines 29 and the air tubes in the cable 9 may vary depending on the tool 24 to be attached to the robot 101.

As shown in FIGS. 1 and 2, two holes (a first hole 33 and a second hole 34) are provided in a sidewall part 13a on one side (the lower side in the view of FIG. 2) of the second upper arm part 13 at a predetermined distance in the longitudinal direction in the upper arm 11. The first hole 33 is provided in the vicinity of the connection part with the first upper arm part 12, and the second hole 34 is provided in a base portion of the wrist support part 16. The second cable accommodating portion 28 and an exterior space Q of the robot 101 are communicated by the first hole 33. Further, the wrist arrangement portion 17 and the exterior space Q are communicated by the second hole 34.

The cable 9 which has been passed through the pipe member 27 and accommodated in the second cable accommodating portion 28 of the second upper arm part 13 is drawn out to the exterior space Q through the first hole 33, then disposed so as to be almost in contact with the wall surface of the sidewall part 13a of the second upper arm part 13 while being exposed to the exterior space Q and so as to be hardly movable in the axial direction of the cable 9, and thereafter drawn into the wrist arrangement portion 17 through the second hole 34. Then, the cable 19 enters a through hole 21a of the second wrist part 21 between the pair of first wrist parts 19 constituting the wrist 18, then passes through the wrist 18, and thereafter extended to the tool 24. It is preferable that the cable 9 is secured to the sidewall part 13a of the second upper arm part 13 by means of a part such as a saddle (not shown) so that the cable 9 exposed to the exterior space Q does not move in the axial direction, and also so that a gap between the cable 9 and the sidewall part 13a does not increase.

Figure 4:
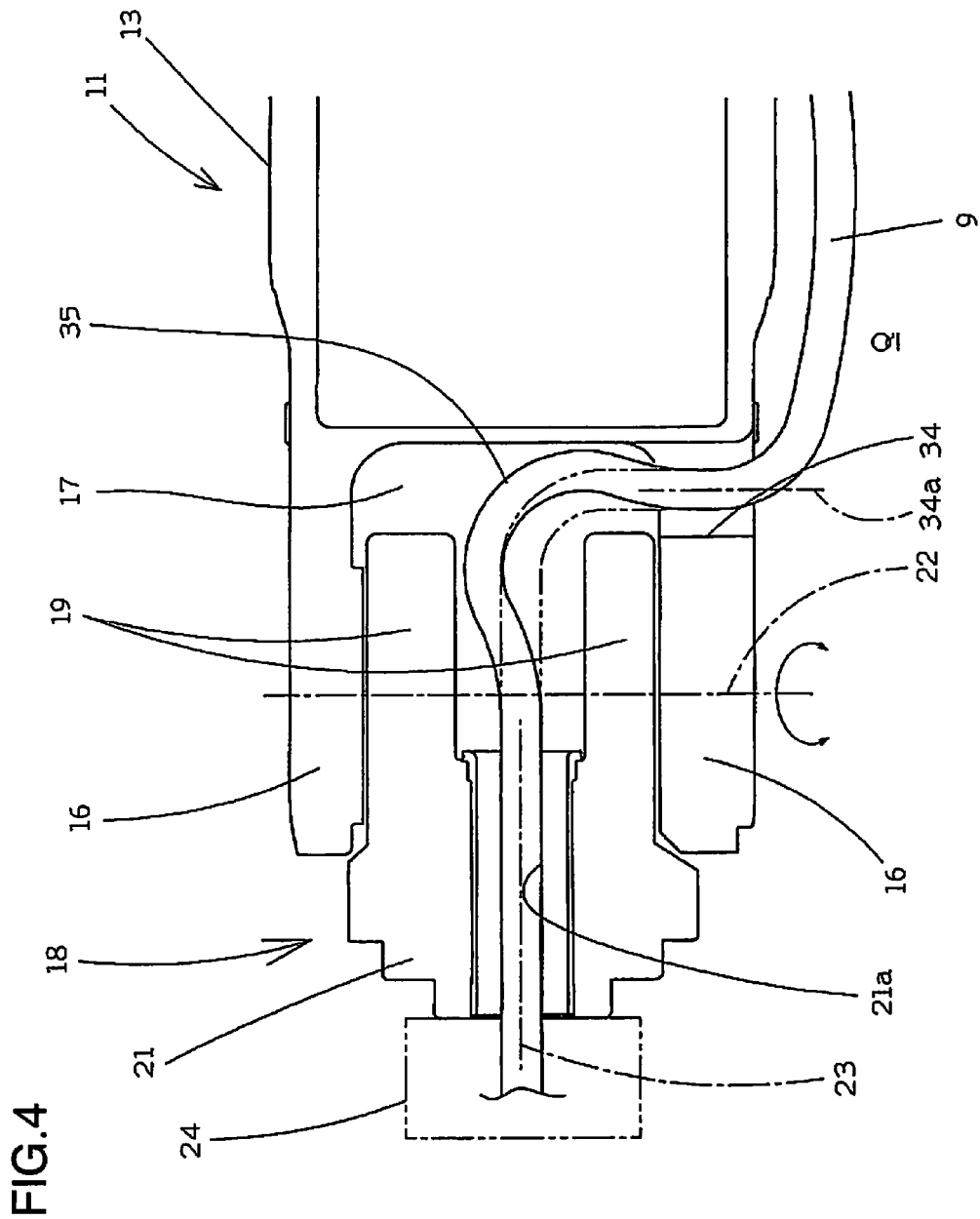
FIG. 4 is an explanatory view of operation of a slack part 35 of the cable 9 in the first embodiment.

As shown in FIGS. 2 and 4, when the wrist 18 pivots about the fifth pivot axis 22, the cable 9 which has been extended to the wrist 18 is pulled. In order to prevent that such pulling damages the cable 9, a portion of the cable 9 that is disposed between an exit part of the second hole 34 and an entrance part of the through hole 21a of the wrist 18 is disposed so as to have a certain slack (a slack part 35). As a result of this, a length of the cable 9 pulled by the wrist 18 when the wrist 18 pivots is compensated by a slack length of the cable 9 which is slackened in the wrist arrangement portion 17.

Here, as shown in FIG. 4, a center line 34a of the second hole 34 is disposed perpendicular to a sixth pivot axis 23 of the wrist 18. When the wrist 18 is disposed in an original position (the position shown in FIG. 1), the slack part 35 of the cable 9 disposed in the wrist arrangement portion 17 is disposed in a curved state (almost U-shaped state) having a slack with a predetermined length in the plan view. As the wrist 18 pivots, the slack part 35 of the cable 9 rotates in accordance with and along with the wrist 18 while gradually decreasing the slack (marginal length) thereof. In FIG. 4, the state of the slack part 35 at the time that the wrist 18 maximally pivots is shown by two-dot chain lines.

Regarding the action of the robot 101 according to the first embodiment, the behavior of the cable 9 at the time that the upper arm 11 and the wrist 18 pivot will be described. When the upper arm 11 pivots about the third pivot axis 14, the cable 9 disposed on the sidewall part 13a of the second upper arm part 13 also moves integrally with the upper arm 11. The cable 9 exposed at the sidewall part 13a of the second upper arm part 13 is attached thereto in a close contact state and so as to be hardly movable in the axial direction of the cable 9, and therefore pivots integrally with the upper arm 11. As a result of this, the cable will not move uncontrollably even if the upper arm 11 pivots at a high speed. It is noted that the exactly same applies to the case that the second upper arm part 13 pivots about the fourth pivot axis 15 with respect to the first upper arm part 12.

When the wrist 18 pivots about the fifth pivot axis 22, the cable 9 disposed in the wrist arrangement portion 17 rotates in accordance with the pivoting of the wrist 18 while gradually decreasing its slack. Since a pulled length of the cable 9 pulled by the pivoting of the wrist 18 is compensated by a preset slack part 35, it is not likely that the cable 9 is pulled to an excessive extent and thereby damaged. Moreover, since the cable 9 is interposed between the pair of the first wrist parts 19 of the wrist 18, it is also not likely that the cable 9 moves uncontrollably.

Since the sixth pivot axis 23 of the wrist 18 and the central axis of the cable 9 are disposed on the same line at the second wrist part 21 of the wrist 18, the amount of twist of the cable 9 when the second wrist part 21 pivots is limited to be small.

As described above, the portion of the cable 9 exposed at the second upper arm part 13 is substantially secured to the sidewall part 13a of the second upper arm part 13. For that reason, the exposed portion of the cable 9 pivots integrally with the upper arm 11 when the upper arm 11 pivots, and therefore the cable 9 will not move uncontrollably. Moreover, since the cable 9 is attached to the upper arm 11 in an almost secured state (in other words, it is not necessary to consider the slackening of the cable 9 at the time that the upper arm 11 pivots in the case of the robot 101 according to the first embodiment), the work of arranging and attaching the cable 9 becomes easy.

Thus, a portion of the cable 9 that is in a free state (that is, a state in which the cable 9 is movable in all directions) is only a very short portion extending from the exit part of the second hole 34 of the upper arm 11 to the entrance part of the through hole 21a of the wrist 18 (namely, a portion disposed in the wrist arrangement portion 17). Furthermore, the periphery of the wrist arrangement portion 17 is surrounded by the second upper arm part 13 and the wrist 18. As a result of this, even if the cable 9 moves uncontrollably for any reason, it will be restricted by the peripheral members. Since, as described above, the robot 101 according to the first embodiment prevents the "uncontrollable movement" of the cable 9 without making the work of installing the cable 9 difficult, the durability of the cable 9 is improved, and consequently high speed motion of the robot 101 is enabled.

In addition, since the cable 9 exposed to the exterior space Q operates as if the cable 9 is integrated with the upper arm 11 of the robot 101, the appearance of the robot 101 is not degraded by exposing the cable 9.

(Embodiment 2)

Figure 5:
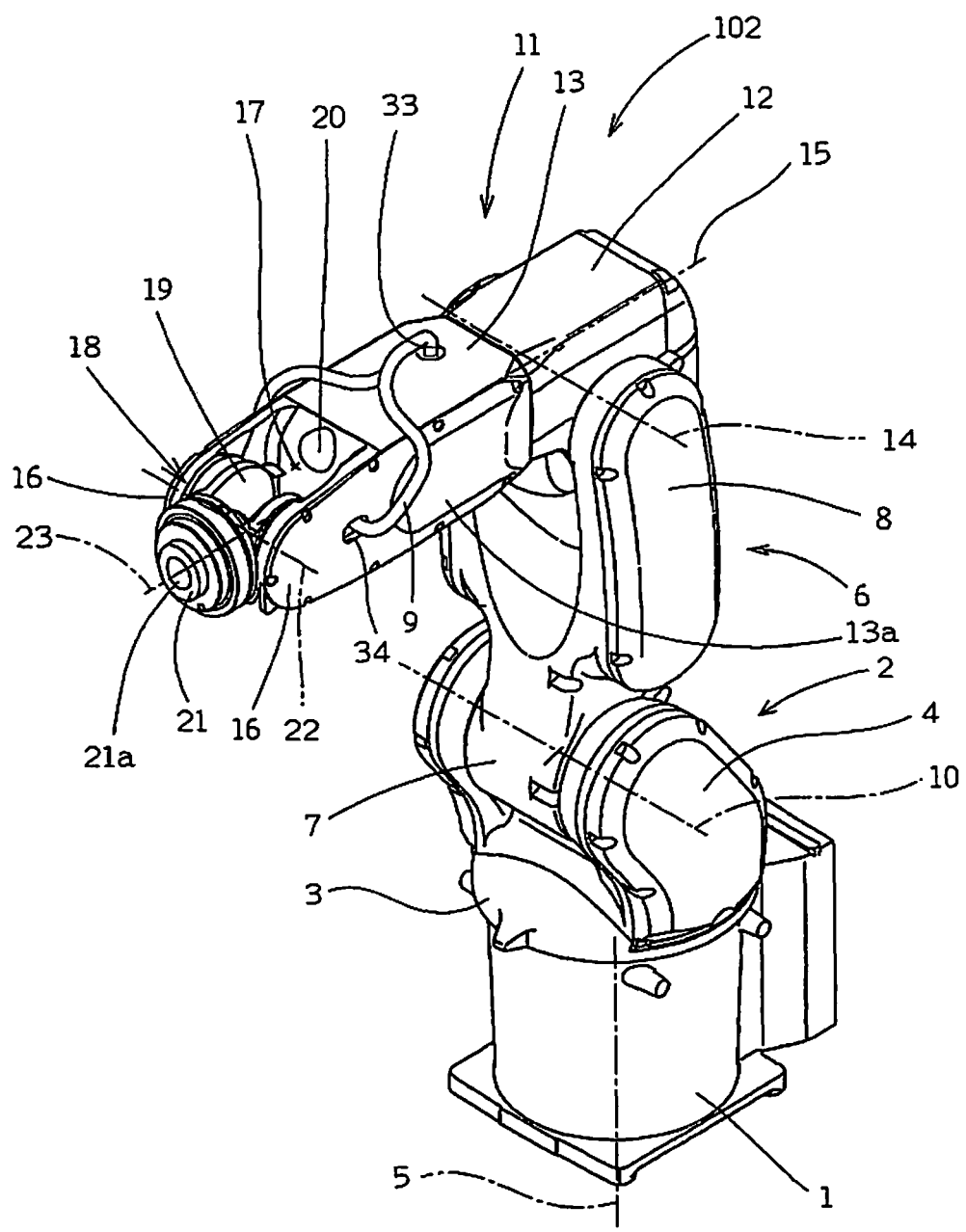
FIG. 5 is a perspective view of a robot 102 according to a second embodiment.

In the case of the robot 101 according to the first embodiment, the single first hole 33 and the single second hole 34 are provided only in the sidewall part 13a on one side of the second upper arm part 13. In contrast to this, in a robot 102 according to a second embodiment shown in FIG. 5, one first hole 33 is provided in an upper wall part 13b of the second upper arm part 13, and a second hole 34 is provided in each of a pair of sidewall parts 13a. In the case of this robot 102, the cable 9 drawn from the first hole 33 of the second upper arm part 13 is branched into two directions, each of the branched cables 9 is drawn into the wrist arrangement portion 17 through the corresponding second hole 34, and thereafter the cables 9 are integrated with each other to pass through a through hole 21a of the wrist 18. In the case of the robot 102 according to the second embodiment, even if the outer diameter of the cable 9 increases, the work of installing the cable 9 to the wrist 18 is easy and the appearance of the robot 102 is not degraded.

(Embodiment 3)

Figure 6:
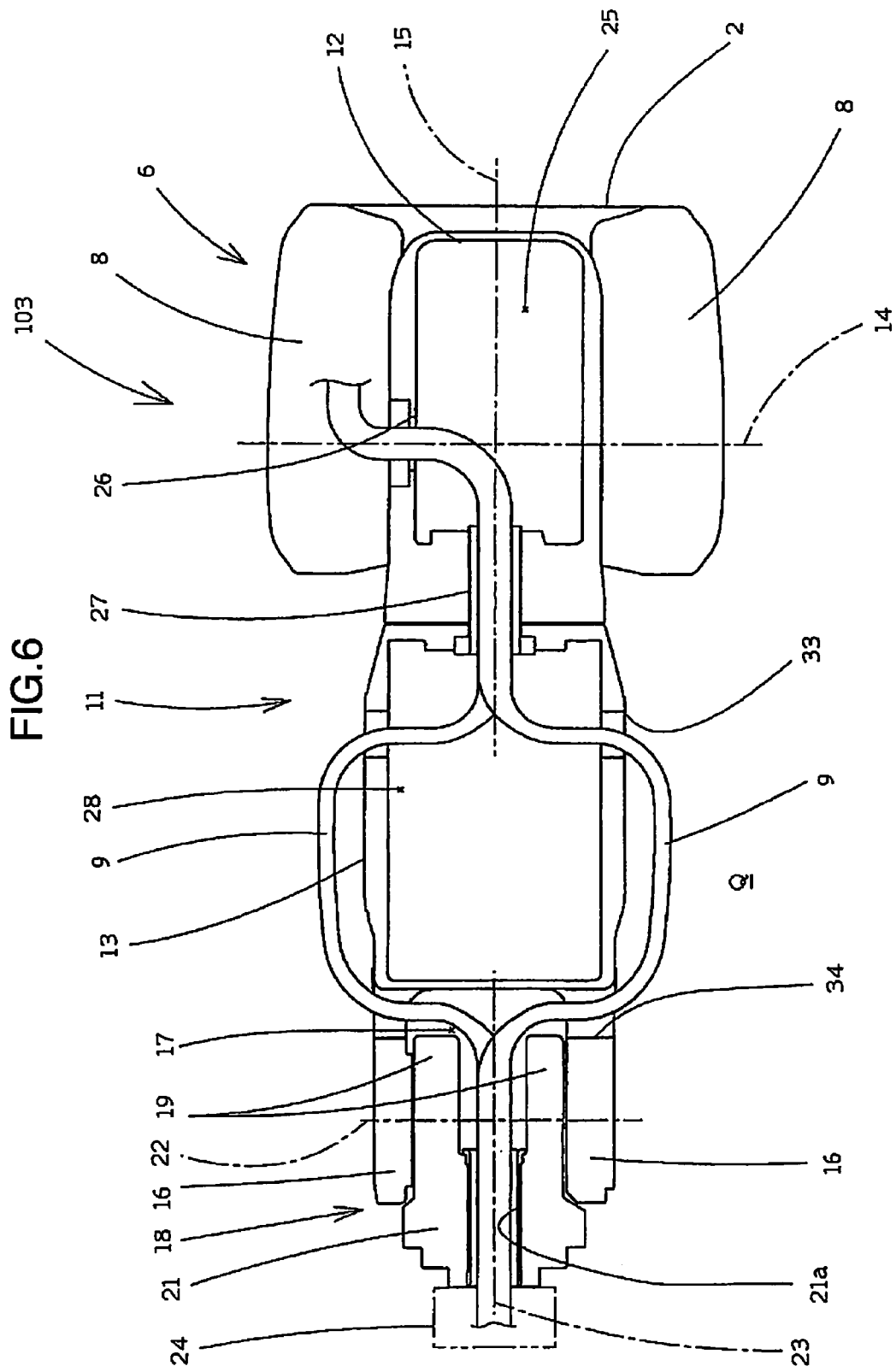
FIG. 6 is a plan sectional view of an upper arm 11 of a robot 103 according to a third embodiment.

In a robot 103 according to a third embodiment shown in FIG. 6, a first hole 33 and a second hole 34 are provided in each of a pair of sidewall parts 13*a* of the second upper arm part 13. In the robot 102 according to the second embodiment, the cable 9 is branched off after being passed through the first hole 33. In contrast to this, the robot 103 according to the third embodiment has a configuration in which the cable is branched off before it is passed through the first hole 33 (namely, within a second accommodating portion 28 of the second upper arm part 13). The robot 103 according to the third embodiment achieves the same effect as that of the robot 102 according to the second embodiment.

In the robots 101 to 103 according to the first to third embodiments herein, description has been made on the case in which the cable 9 extends in the surroundings of the upper arm 11. However, the cable 9 may extend in the same manner not only in the upper arm 11 but also in the lower arm 6.

The robots 101 to 103 according to the first to third embodiments of the present application have a configuration in which the wrist 18 is interposed between a pair of wrist support parts 16 and is also supported by them so as to be rotated. As a result of this, the rigidity of the wrist 18 increases. However, the wrist 18 may have a cantilever structure in which the wrist 18 is supported by a single wrist support part 16.

The present invention may be used particularly as an industrial robot of a compact size and having an arm capable of pivoting at high speed.

The invention claimed is:

1. An industrial robot, comprising:
   a frame;
   an arm pivotally attached to the frame; and
   a wrist pivotally attached to the arm, wherein
   the arm comprises a cable accommodating portion for accommodating a cable therein that extends from the frame, a pair of wrist support parts arranged on a distal side of the arm, a wrist arrangement portion between the pair of wrist support parts for disposing the wrist so as to be rotatable in the wrist arrangement portion, a first hole communicating the cable accommodating portion with an exterior space of the arm in a direction different from a longitudinal direction of the arm, and a second hole communicating the wrist arrangement portion with the exterior space of the arm in a direction different from the longitudinal direction of the arm, and
   the cable extending from the frame to the cable accommodating portion further extends to the wrist by being once drawn out to the exterior space of the arm through the first hole and then drawn into the wrist arrangement portion through the second hole from the exterior space of the arm.

2. The industrial robot according to claim 1, wherein each one of the first hole and the second hole is provided at one of a top surface of the arm and a side surface of the arm.

3. The industrial robot according to claim 1, wherein a portion of the cable that is disposed between an exit part of the first hole and an entrance part of the second hole is secured to the arm.

4. The industrial robot according to claim 1, wherein
   a working tool is attached to the wrist, and the wrist comprises a through hole passing therethrough, and
   the cable drawn into the wrist arrangement portion further extends to the working tool through the through hole.

5. The industrial robot according to claim 1, wherein
   the arm comprises a first arm part pivotally attached to the frame, and a second arm part extending from and pivotally attached to the first arm part, the wrist arrangement portion being provided in the second arm part, and
   the first hole and the second hole are provided in the second arm part.

6. The industrial robot according to claim 1, wherein the cable extends between the second hole and the wrist with a certain slack, and the slack has a length larger than a length of the cable that is pulled by the wrist when the wrist maximally pivots with respect to the arm.

7. The industrial robot according to claim 1, wherein both the first hole and the second hole are at a side surface of the arm.

8. The industrial robot according to claim 1, wherein:
   the first hole is at a top surface of the arm; and
   the second hole includes two second holes on opposite side surfaces of the arm.

9. The industrial robot according to claim 1, wherein:
   the first hole includes two first holes on opposite side surfaces of the arm; and
   the second hole includes two second holes on opposite side surfaces of the arm.

* * * * *